United States Patent
Sasaki et al.

(10) Patent No.: US 10,063,126 B2
(45) Date of Patent: Aug. 28, 2018

(54) METHOD AND APPARATUS FOR MANUFACTURING LAMINATED IRON CORE

(71) Applicant: MITSUI HIGH-TEC, INC., Kitakyushu-shi, Fukuoka (JP)

(72) Inventors: Hidemi Sasaki, Fukuoka (JP); Tadashi Shibuta, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 225 days.

(21) Appl. No.: 15/202,898

(22) Filed: Jul. 6, 2016

(65) Prior Publication Data
US 2017/0012507 A1 Jan. 12, 2017

(30) Foreign Application Priority Data
Jul. 10, 2015 (JP) ................. 2015-138881

(51) Int. Cl.
*H01F 7/06* (2006.01)
*H02K 15/02* (2006.01)
(Continued)

(52) U.S. Cl.
CPC ............ *H02K 15/02* (2013.01); *B23K 31/02* (2013.01); *B23K 37/047* (2013.01); *B23K 37/0435* (2013.01); *B23K 37/0461* (2013.01); *H02K 15/03* (2013.01); *B23K 2201/06* (2013.01); *B23K 2203/04* (2013.01)

(58) Field of Classification Search
CPC ............................ H02K 1/148; H02K 15/022
See application file for complete search history.

(56) References Cited

U.S. PATENT DOCUMENTS

| 6,484,387 | B1 | 11/2002 | Lee et al. |
| 9,251,939 | B1 * | 2/2016 | Miyamoto ............. H01F 27/24 |

(Continued)

FOREIGN PATENT DOCUMENTS

| CN | 102474167 | 5/2012 |
| CN | 102891571 | 1/2013 |

(Continued)

OTHER PUBLICATIONS

Office Action issued in Canada Counterpart Patent Appl. No. 2935356, dated Sep. 19, 2017.
(Continued)

*Primary Examiner* — Paul D Kim
(74) *Attorney, Agent, or Firm* — Greenblum & Bernstein, P.L.C.

(57) ABSTRACT

There is provided a method for manufacturing a laminated iron core. The method includes receiving a plurality of block iron cores which are temporarily laminated and ejected from a die, each block iron core being formed by laminating a plurality of iron core pieces that are blanked from a thin plate workpiece using the die, individually separating the temporarily laminated block iron cores by a block iron core separating unit, and rotating and laminating each of the separated block iron cores by a rotating and laminating unit in order different from order of lamination of the temporarily laminated block iron cores before separation in a place different from a location of the die.

14 Claims, 7 Drawing Sheets

(51) Int. Cl.
  *B23K 37/047* (2006.01)
  *H02K 15/03* (2006.01)
  *B23K 37/04* (2006.01)
  *B23K 31/02* (2006.01)
  *B23K 101/06* (2006.01)
  *B23K 103/04* (2006.01)

(56) References Cited

U.S. PATENT DOCUMENTS

| | | |
|---|---|---|
| 2010/0154968 A1 | 6/2010 | Shirai et al. |
| 2012/0206008 A1 | 8/2012 | Blanc et al. |
| 2013/0020010 A1 | 1/2013 | Namaike et al. |
| 2013/0032297 A1 | 2/2013 | Coto et al. |
| 2013/0167696 A1 | 7/2013 | Ueno et al. |
| 2014/0144592 A1 | 5/2014 | Coto et al. |
| 2017/0005551 A1* | 1/2017 | Sasaki .................. H02K 15/02 |

FOREIGN PATENT DOCUMENTS

| | | |
|---|---|---|
| CN | 103097052 | 5/2013 |
| CN | 103857610 | 6/2014 |
| CN | 203872005 | 10/2014 |
| JP | 11-55906 | 2/1999 |
| JP | 11-252872 | 9/1999 |
| JP | 2003-200296 | 7/2003 |
| JP | 2011-156585 | 8/2011 |

OTHER PUBLICATIONS

Office Action issued in China Counterpart Patent Appl. No. 201610543947.6, dated Apr. 23, 2018 , along with an English translation thereof.

* cited by examiner

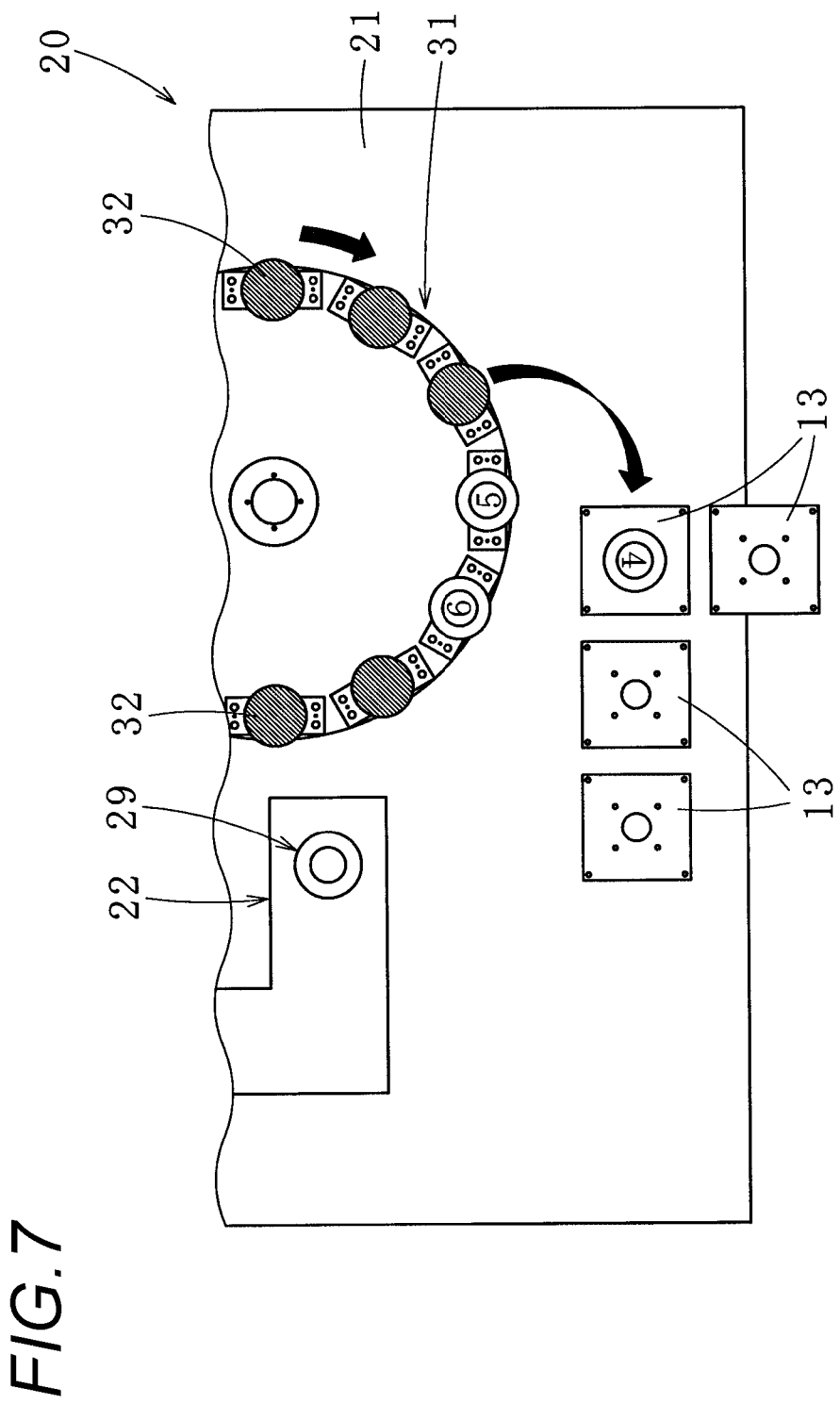

METHOD AND APPARATUS FOR MANUFACTURING LAMINATED IRON CORE

CROSS REFERENCE TO RELATED APPLICATION

This application is based upon and claims the benefit of priority of Japanese Patent Application No. 2015-138881 filed on Jul. 10, 2015, the contents of which are incorporated herein by reference in its entirety.

BACKGROUND OF THE INVENTION

1. Field of the Invention

The present invention relates to a method for manufacturing a laminated iron core by rotating and laminating a plurality of block iron cores respectively formed by laminating a plurality of iron core pieces blanked from a thin plate workpiece using a die, in a place (that is, the outside of the die) different from a location of the die, and an apparatus for manufacturing the laminated iron core.

2. Description of the Related Art

A laminated iron core is formed by laminating plural iron core pieces blanked from a thin plate workpiece. Since this thin plate workpiece has a plate thickness deviation, each of the iron core pieces is rotated by a given angle and then is laminated (so-called rotated and laminated) to thereby eliminate the plate thickness deviation of the thin plate workpiece.

For example, JP-A-2011-156585 as Patent Literature 1 discloses rotation and lamination, and this can improve accuracy of dimensions such as squareness or parallelism of the laminated iron core, with the result that the rotation and lamination are very effective as a method for improving motor characteristics.

An apparatus (rotating and laminating apparatus) for performing the rotation and lamination includes a case (so-called rotation and lamination inside a die) of being incorporated into a blanking die (hereinafter simply also called a die) for manufacturing the iron core piece, and a case (so-called rotation and lamination outside the die) of being installed outside the blanking die.

In the latter case, the iron core piece is blanked and formed by the blanking die, and a laminated body (hereinafter called a block iron core) laminated in any lamination thickness is ejected to the outside of the die and then, each of the block iron cores is rotated and laminated in a step separate from blanking.

The iron core piece located in the lowermost layer of each of the block iron cores is provided with only a through hole (caulking through hole) for reducing interference of a caulking protrusion formed for the purpose of mutually fixing the iron core pieces adjacent in a lamination direction. Accordingly, each of the block iron cores can be rotated and laminated smoothly.

After the rotation and lamination described above, for a stator iron core, each of the block iron cores is mutually fixed by welding and also, for a rotor iron core, a step of filling a magnet-insert hole with a resin with each of the block iron cores stacked is had, with the result that each of the block iron cores is mutually fixed using a binding force by the resin.

As a laminated iron core formed by laminating plural block iron cores, JP-A-11-55906 as Patent Literature 2 discloses a laminated iron core constructed of plural block iron cores (CB1 to CB5) formed by respectively laminating two or more kinds of iron core pieces with different shapes.

In the laminated iron core constructed in this manner, each of the plural block iron cores (CB1 to C135) must satisfy a management value of a lamination thickness (lamination height of the iron core pieces), with the result that the lamination thickness of each of the block iron cores is inspected, and each of the block iron cores is rotated and laminated using the block iron core satisfying the management value of the lamination thickness.

Patent Literature 1 JP-A-2011-156585
Patent Literature 2: JP-A-11-55906

SUMMARY OF THE INVENTION

Since the laminated iron core ejected from a die is in a state (temporarily laminated state) in which each of the block iron cores is laminated, it is necessary to once separate or disassemble the laminated block iron cores in order to inspect the lamination thickness of each of the block iron cores. As a result, in the case of manufacturing the laminated iron core, it is necessary to again laminate and assemble each of the separated block iron cores.

When a worker does this work manually, the worker may mistake order of lamination or an angle of rotation and lamination of each of the block iron cores, with the result that a defective product may be caused.

In addition, in the case of doing work of removing burrs (substances produced at the time of fitting a caulking protrusion into a caulking through hole) from the laminated iron core, the work of removing the burrs must be done after each of the block iron cores is disassembled, and when each of the block iron cores is rotated and laminated subsequently; order of lamination or an angle of rotation and lamination of each of the block iron cores may be mistaken like the case of inspecting the lamination thickness described above.

The present invention has been implemented in view of such circumstances, and a non-limited object of the present invention is to provide a method for manufacturing a laminated iron core capable of rotating and laminating each of the block iron cores without mistaking order of lamination or an angle of rotation and lamination of each of the block iron cores, and an apparatus for manufacturing the laminated iron core.

A first aspect of the present invention provides a method for manufacturing a laminated iron core, the method including: receiving a plurality of block iron cores which are temporarily laminated, and ejected from a die, each block iron core being formed by laminating a plurality of iron core pieces that are blanked from a thin plate workpiece using the die; individually separating the temporarily laminated block iron cores by a block iron core separating unit; and rotating and laminating each of the separated block iron cores by a rotating and laminating unit in order different from order of lamination of the temporarily laminated block iron cores before separation in a place different from a location of the die.

The method for manufacturing the laminated iron core according to the first aspect of the present invention may be configured so that each of the individually separated block iron cores is sequentially arranged on a disk-shaped placement table rotatable around a shaft center at intervals in a circumferential direction of the placement table.

Here, the method may further includes inspecting a lamination thickness of each of the block iron cores by a lamination thickness inspecting unit between separating the temporarily laminated block iron cores and rotating and laminating the separated block iron cores.

The method may further includes inspecting a shape of each of the block iron cores by a shape inspecting unit between separating the temporarily laminated block iron cores and rotating and laminating the separated block iron.

The method may still further includes reversing fronts and backs of a unit of the plurality of temporarily laminated block iron cores by a reversing unit before separating the temporarily laminated block iron cores.

Here, the method may further includes removing burrs projected at a back side of each of the block iron cores by a burr removing unit between separating the temporarily laminated block iron cores and rotating and laminating the separated block iron cores.

A second aspect of the present invention provides an apparatus for manufacturing a laminated iron core, the apparatus including: a block iron core separating unit that is provided, in an upstream side and receives a plurality of block iron cores which are temporarily laminated and ejected from a die, each block iron core being formed by laminating a plurality of iron core pieces that are blanked from a thin plate workpiece using the die, wherein the block iron core separating unit individually separates the temporarily laminated block iron cores; and a rotating and laminating that is provided in a downstream side of the block iron core separating unit and rotates and laminates each of the separated block iron cores in order different from order of lamination of the temporarily laminated block iron cores before separation in a place different from a location of the die.

The apparatus for manufacturing the laminated iron core according to the second aspect of the present invention may further include a disk-shaped placement table rotatable around a shaft center, wherein each of the block iron cores individually separated by the block iron core separating unit can be arranged on the placement table at intervals in a circumferential direction.

Here the apparatus may further include a lamination thickness inspecting unit that inspects a lamination thickness of each of the block iron cores individually separated by the block iron core separating unit in a downstream side of the block iron core separating unit and an upstream side of the rotating and laminating unit.

The apparatus may further include a shape inspecting unit that inspects a shape of each of the block iron cores individually separated by the block iron core separating unit in a downstream side of the block iron core separating unit and an upstream side of the rotating and laminating unit.

The apparatus may still further include a reversing unit that reverses fronts and backs of a unit of the plurality of temporarily laminated block iron ores in upstream side of the block iron core separating unit.

Here, the apparatus may further include a burr removing unit that removes burrs projected at a back side of each of the block iron cores individually separated by the block iron core separating unit in a downstream side of the block iron core separating unit and an upstream side of the rotating and laminating unit.

In the method and the apparatus for manufacturing the laminated iron core according to the aspects of the present invention, in the case of rotating and laminating the plural block iron cores in the place different from the location of the temporarily laminated block iron cores are individually separated by the block iron core separating unit and each of the separated block iron cores is rotated and laminated by the rotating and laminating unit, with the result that each of the block iron cores can be rotated and laminated without mistaking the order of lamination or an angle of rotation and lamination of each of the block iron cores. Accordingly, occurrence of a defective product can be prevented.

Also, when each of the individually separated block iron cores is arranged on the disk-shaped placement table rotatable around the shaft center in certain intervals in the circumferential direction of the placement table, space can be saved as compared with the case of linearly arranging each of the separated block iron cores.

Particularly, in the case of doing work of removing the burrs and work of inspecting the lamination thickness or the shape of each of the block iron cores on the placement table, each of the block iron cores on the placement table can be sequentially moved to the places of various pieces of work described, above by rotating the disk-shaped placement table. Accordingly, work efficiency can be increased since the various pieces of work can be done in parallel with work of separation or work of rotation and lamination of each of the block iron cores.

BRIEF DESCRIPTION OF THE DRAWINGS

In the accompanying drawings:

FIG. 7 is an explanatory diagram of the rotating and laminating step.

DETAILED DESCRIPTION OF TIE EXEMPLARY EMBODIMENTS

An embodiment embodying the present invention will be described with reference to the accompanying drawings, and the present invention will be understood.

First, a laminated iron core 10 manufactured using a method for manufacturing the laminated iron core according to one embodiment of the present invention will be described with reference to FIG. 1A.

The laminated iron core 10 is a rotor iron core (or simply called as a rotor).

This laminated iron core 10 is formed by sequentially rotating and laminating plural (six herein) block iron cores No. 1 to No. 6 formed by respectively laminating plural annular iron core pieces. Here, the block iron cores No. 1 and No. 6, No. 2 and No. 5, and No. 3 and No. 4 have the same shape, respectively, but, for example, all the block iron cores may have the same shape or different shapes.

Figure 1A:
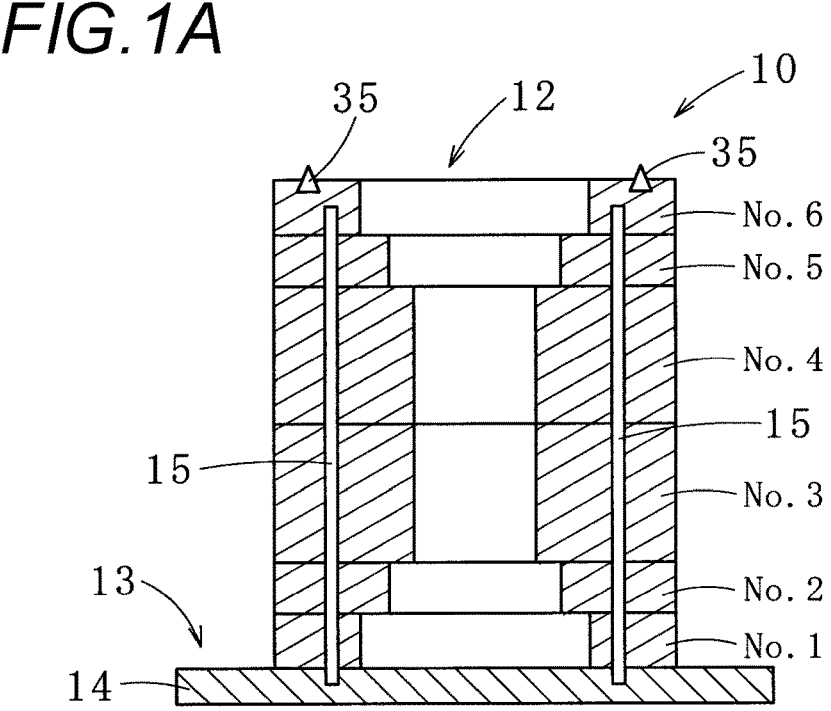
FIG. 1A is a sectional side view of a laminated iron core manufactured by a method for manufacturing the laminated iron core according to one embodiment of the present invention.
Figure 1B:
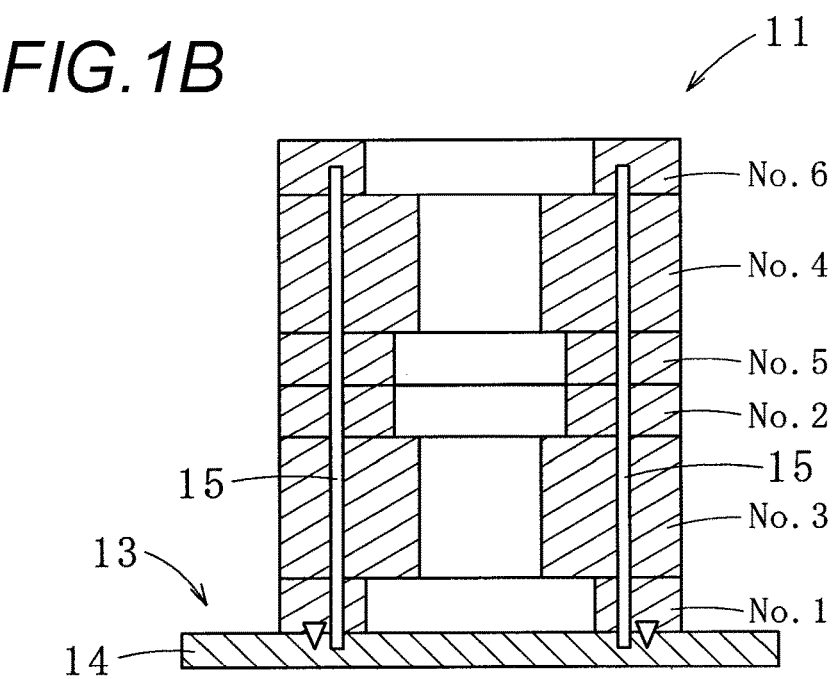
FIG. 1B is a sectional side view of a laminated iron core according to a modified example.

Also, a laminated iron core 11 of FIG. 1B can be formed by reversing the front and back of each of the block iron cores No. 1 to No. 6 shown in FIG. 1A and changing (replacing) order of lamination of each of the block iron cores.

The center of the laminated iron core 10 is formed with a shaft hole (shaft hole) 12, and plural magnet-insert holes (not shown), for permanent magnets, made of through holes formed in a lamination direction of the laminated iron core 10 are formed in the periphery (circumferentially) around this shaft hole 12. The permanent magnet is fixed into this magnet-insert hole using a resin (a thermosetting resin (for example, an epoxy resin) or a thermoplastic resin).

This laminated iron core 10 is further formed with plural weight reduction holes (not shown) made of through holes in the periphery of the laminated iron core 10 around the shaft hole 12.

The block iron cores No. 1 to No. 6 constructing the laminated iron core 10 are mutually fixed using a binding force by the above resin with which each of the magnet-insert holes is filled, but may further be joined using welding.

In addition, the iron core piece constructing the block iron cores No. 1 to No. 6 has an annular integral structure, but may have a divided structure capable of annularly joining plural circularly arcuate iron core piece parts, or a structure capable of connecting a part of the plural circularly arcuate iron core piece parts in a circumferential direction by a joining part and folding this joining part to be formed in an annular shape.

This iron core piece is blanked and formed from a thin plate workpiece (thin metal sheet) made of, for example, an amorphous material or an electromagnetic steel plate with a thickness of about 0.10 to 0.5 mm. In addition, the iron core piece may be a piece blanked from one thin plate workpiece, or a piece blanked from plural for example, two, or three or more) laminated thin plate workpieces.

The iron core pieces adjacent in the lamination direction are mutually joined by caulking protrusions, and the iron core piece located in the uppermost layer of each of the block iron cores No. 1 to No. 6 shown in FIG. 1A or the iron core piece located in the lowermost layer of each of the block iron cores No. 1 to No. 6 shown in FIG. 1B is formed with only the through holes described above.

The laminated iron core 10 (similarly, the laminated iron core 11) can be placed on a jig 13.

The jig 13 is used in the case of rotating and laminating each of the block iron cores No. 1 to No. 6, and includes a support table 14 and plural positioning rods 15 erected on this support table 14. In use, the laminated iron core 10 is positioned with respect to the jig 13 by inserting each of the positioning rods 15 into the weight reduction hole of the laminated iron core 10.

Accordingly, even in a state in which each of the block iron cores No. 1 to No. 6 is only laminated without mutually joining each of the block iron cores, the block iron cores can be prevented from loosening in the case of conveyance.

Also, the laminated iron core may be a stator iron core (stator).

This laminated iron core is formed by rotating and laminating plural block iron cores respectively formed by laminating plural annular iron core pieces blanked from the thin plate workpiece described above. In addition, the block iron cores rotated and laminated are mutually joined using welding.

The laminated iron core has an annular yoke part, and plural magnetic pole parts connected integrally to an inner peripheral side of this yoke part. The yoke part and the magnetic pole parts are respectively formed by laminating plural iron core pieces having yoke piece parts and magnetic pole piece parts. In addition, the magnetic pole piece part is formed by blanking a slot from a strip material.

Subsequently, an apparatus 20 (hereinafter simply also called a manufacturing apparatus) for manufacturing the laminated iron core according to one embodiment of the present invention will be described with reference to FIGS. 1A and 2 to 7. In addition, FIGS. 2 and 4 to 7 show schematic diagrams of the manufacturing apparatus 20 in plan view.

The manufacturing apparatus (rotating and laminating apparatus) 20 is an apparatus for rotating and laminating plural block iron cores No. 1 to No. 6 (simply described as 1 to 6 in FIGS. 2, 4 to 7) respectively formed by laminating plural iron core pieces blanked from a thin plate workpiece using a die (not shown) in a place different from that of the die. The manufacturing apparatus 20 includes a base table 21, and a conveying unit 22, a reversing unit 23, a block iron core separating unit 24, a burr removing unit 25, a lamination thickness inspecting unit 26, a shape inspecting unit 27, and a rotating and laminating unit 28 formed on this base table 21. Hereinafter, description will be made in detail.

The conveying unit 22 horizontally conveys the temporarily laminated block iron cores No. 1 to No. 6 ejected from the die, that is, a laminated iron core 29 in a temporarily laminated state with its laminated state maintained.

As this conveying unit 22, for example, a roller conveyor can be used, but the conveying unit 22 is not limited to this conveyor.

A position of the middle of the conveying unit 22 is provided with the reversing unit 23.

Figure 2:
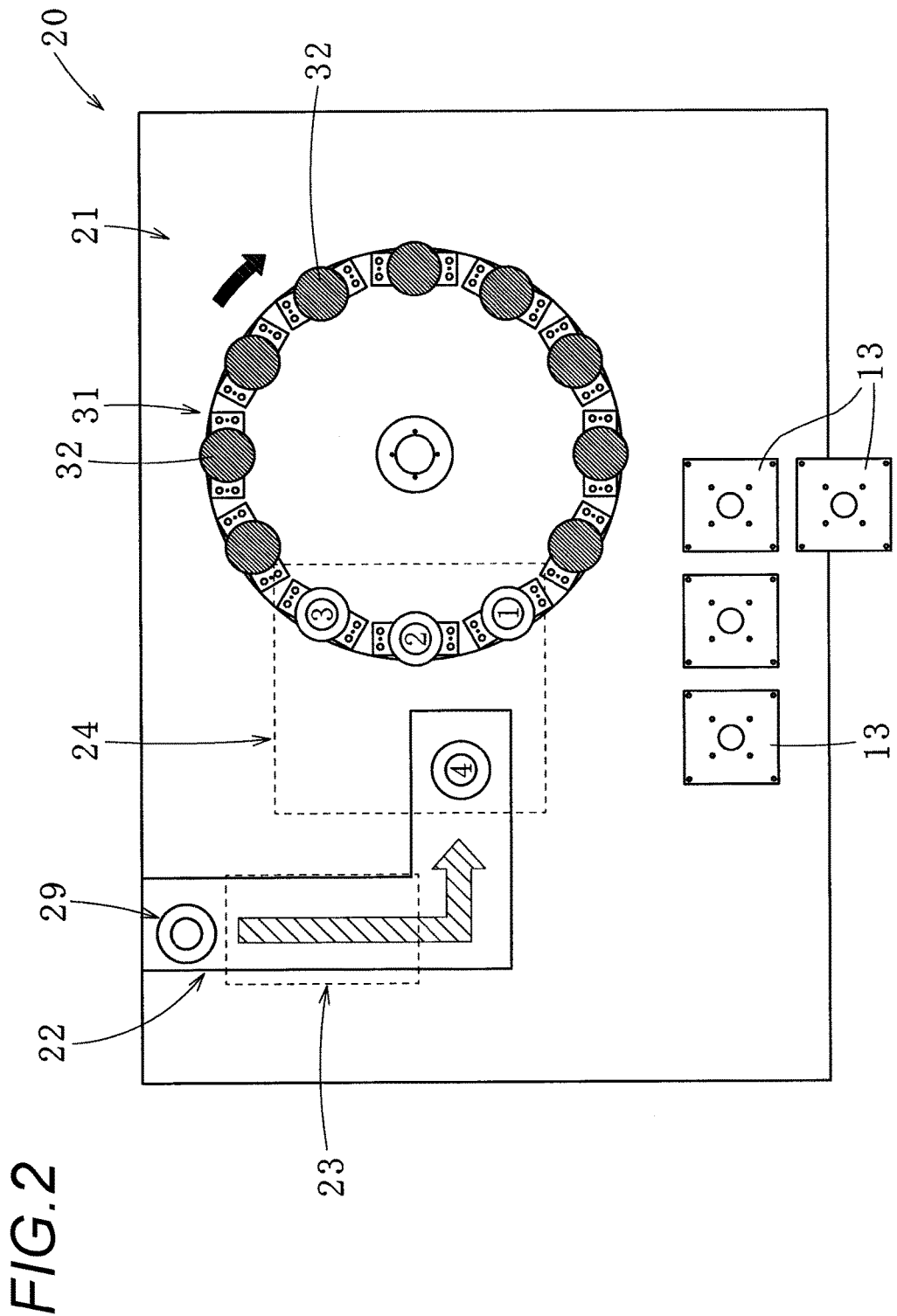
FIG. 2 is an explanatory diagram of a reversing step and a block iron core separating step of the method for manufacturing the laminated iron core.
Figure 3:
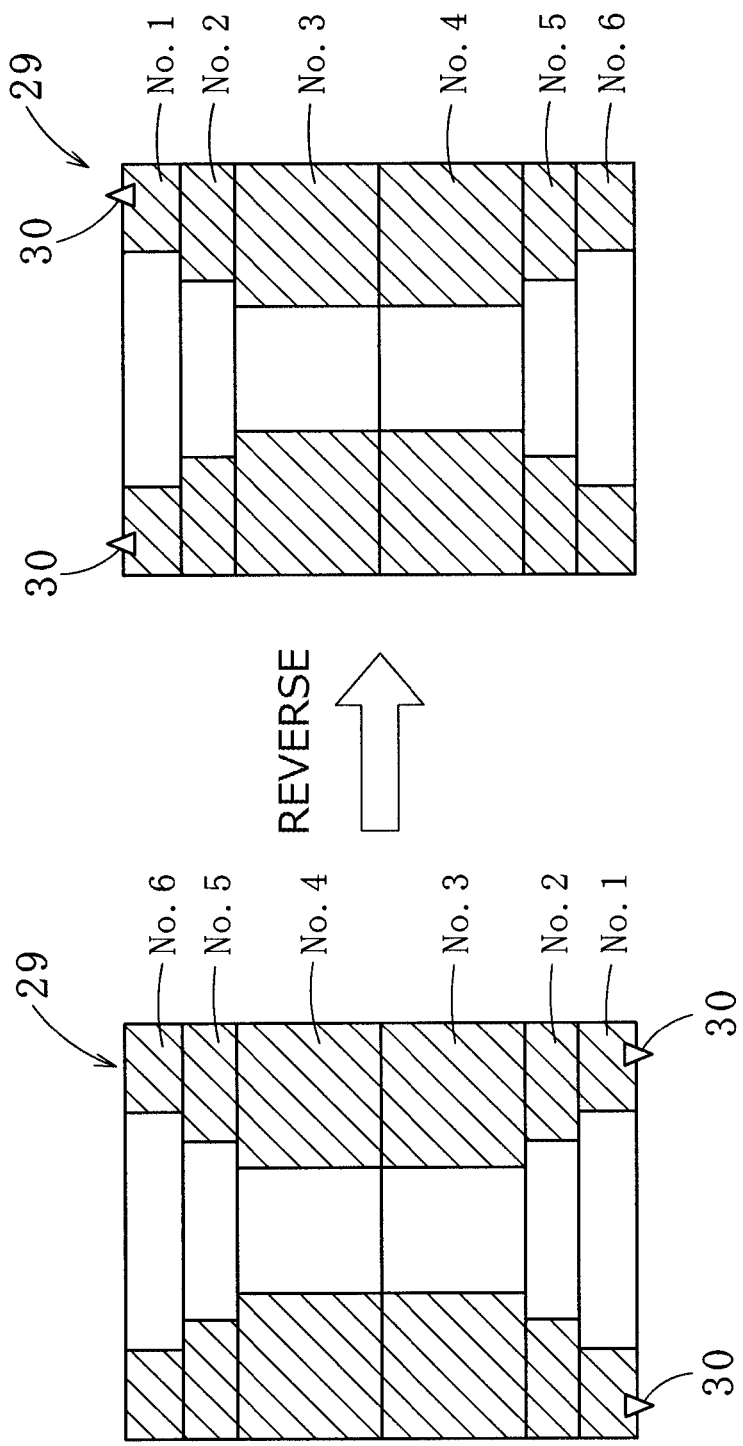
FIG. 3 is an explanatory diagram showing order of lamination of block iron cores before and after the reversing step of the method for manufacturing the laminated iron core.

This reversing unit 23 reverses the fronts and backs (that is, upper and lower portions of the laminated iron core 29 in the temporarily laminated state) of a unit of the temporarily laminated block iron cores No. 1 to No. 6 as shown in FIGS. 2 and 3. For example, the reversing unit 23 can be configured to include a gripping part capable of integrally gripping the temporarily laminated block iron cores No. 1 to No. 6, and a rotating shaft which is formed on this gripping part and reverses the gripping part 180°, but is not limited to this configuration as long as the temporarily laminated block iron cores No. 1 to No. 6 can be integrally reversed.

An installation place of the reversing unit 23 is not particularly limited as long as the installation place is the downstream side of the die and the upstream side of the block iron core separating unit 24, and may be, for example, the outside of the base table 21.

Accordingly, as shown in FIG. 3, order of lamination of the block iron cores is arranged in order of No. 6 to No. 1 from top to bottom in the temporarily laminated state, but is changed in order of No. 1 to No. 6 from top to bottom by the reversing unit 23. By this operation, caulking protrusions 30 of the block iron core No. 1 projected downwardly are projected upwardly.

As shown in FIG. 2, the downstream side of the conveying unit 22 (reversing unit 23) is provided with the block iron core separating unit 24.

This block iron core separating unit 24 individually separates the temporarily laminated block iron cores No. 1 to No. 6. For example, the block iron ore separating unit 24 can be configured to have a robot arm including a gripping part for gripping each of the block iron cores No. 1 to No. 6, but is not limited to this configuration.

In addition, each of the separated block iron cores No. 1 to No. 6 is arranged on a disk-shaped placement table 31 by the block iron core separating unit 24.

The placement table 31 is formed rotatably around the shaft center on the base table 21.

The outer peripheral side of this placement table 31 is provided with plural (12 herein) fixing parts 32 which can arrange each of the block iron cores No. 1 to No. 6 in certain intervals or distances in a circumferential direction of the placement table 31.

Accordingly, the fixing part 32 on which the block iron core is not placed can be intermittently arranged in proximity to the downstream side end of the conveying unit 22 by rotating the placement table 31 through a predetermined angle (90° herein).

Figure 4:
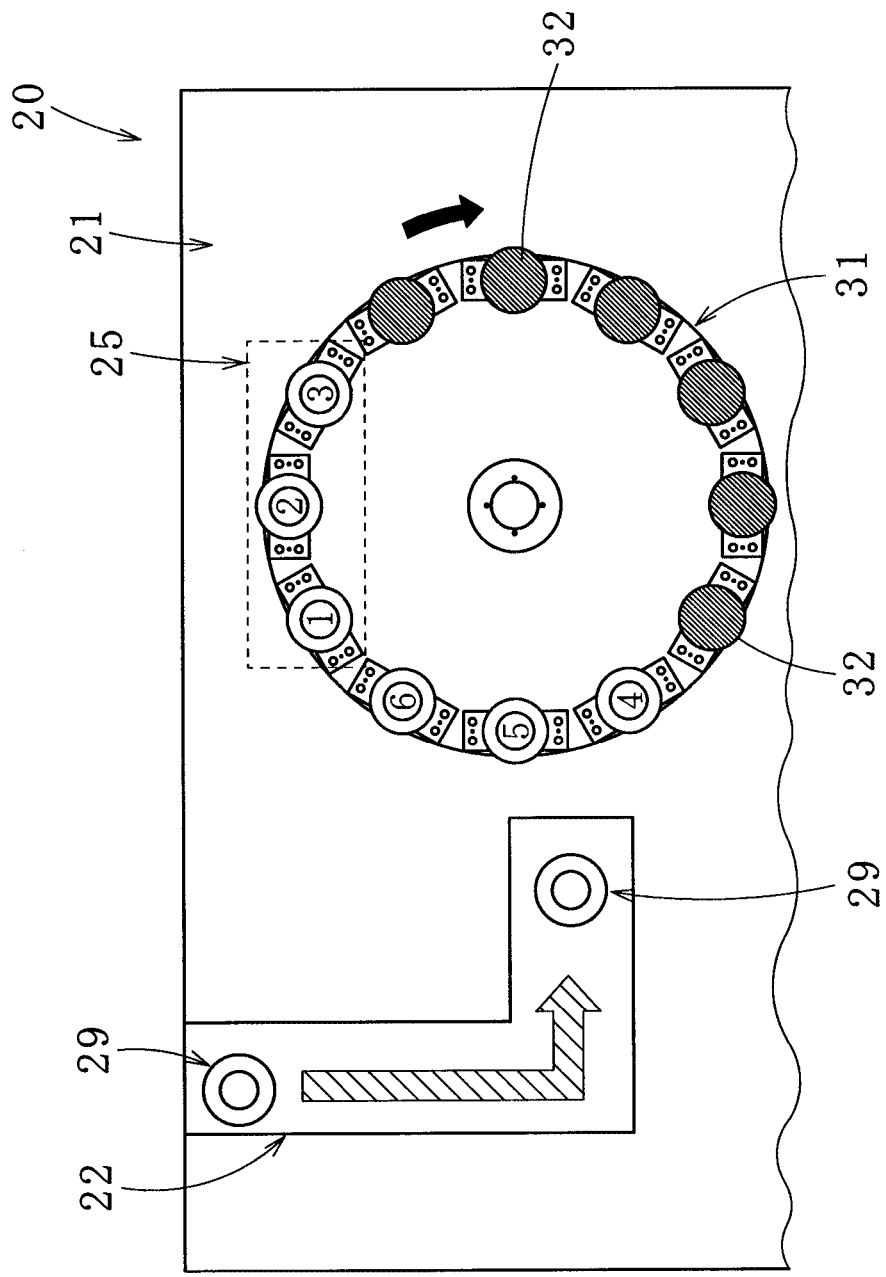
FIG. 4 is an explanatory diagram of a burr removing step of the method for manufacturing the laminated iron core.

As shown in FIG. 4, the downstream side of the block iron core separating unit 24 and the upstream side of the rotating and laminating unit 28 are provided with the burr removing unit 25.

This burr removing unit 25 removes burrs (substances produced at the time of fitting the caulking protrusion into a caulking through hole) projected to the back side of each of the block iron cores No. 1 to No. 6 individually separated by the block iron core separating unit 24. For example, the burr removing unit 25 has a brush part for making rotating contact with the block iron cores (block iron cores No. 1 to No. 3 in FIG. 4) fixed to the fixing parts 32 of the placement table 31. In addition, the brush part is formed upwardly and downwardly movably over the block iron core, and always waits over the block iron core, and makes contact with a back surface of the block iron core only in use. Also, in use, the removed burrs can be sucked and recovered without being scattered by covering the block iron core and the brush part with cover provided with a suction mechanism.

Figure 5:
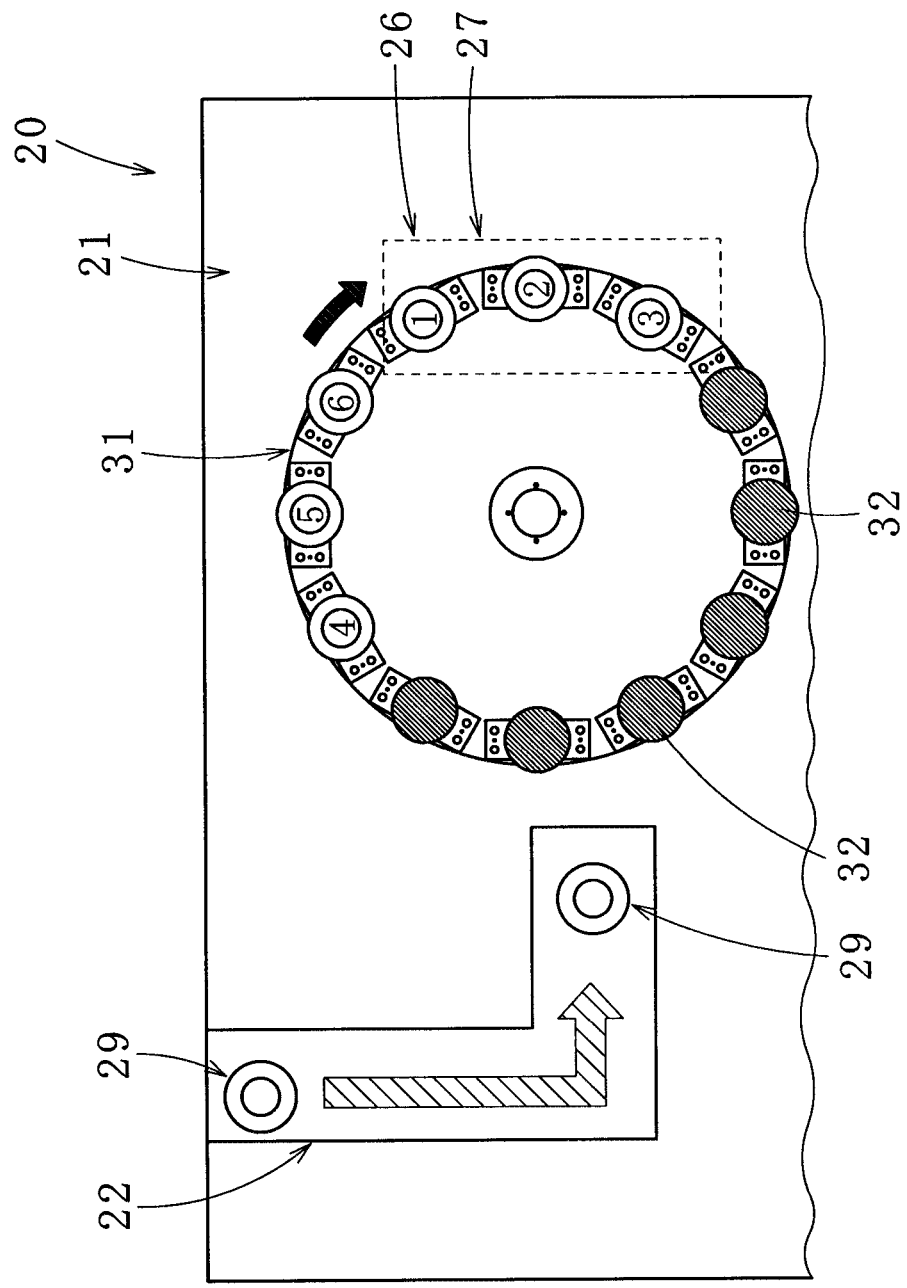
FIG. 5 is an explanatory diagram of a lamination thickness inspecting step and a shape inspecting step of the method for manufacturing the laminated iron core.

As shown in FIG. 5, the downstream side of the burr removing unit 25 (block iron core separating unit 24) and the upstream side of the rotating and laminating unit 28 are provided with the lamination thickness inspecting unit 26 and the shape inspecting unit 27.

The lamination thickness inspecting unit 26 inspects a lamination thickness of each of the block iron cores No. 1 to No. 6 individually separated by the block iron core separating unit 24 and, for example, a depth gauge can be used.

The shape inspecting unit 27 inspects a shape (contour shape) of each of the block iron cores No. 1 to No. 6 individually separated by the block iron core separating unit 24, and can be implemented by, for example, image processing using an imaging camera.

Figure 6:
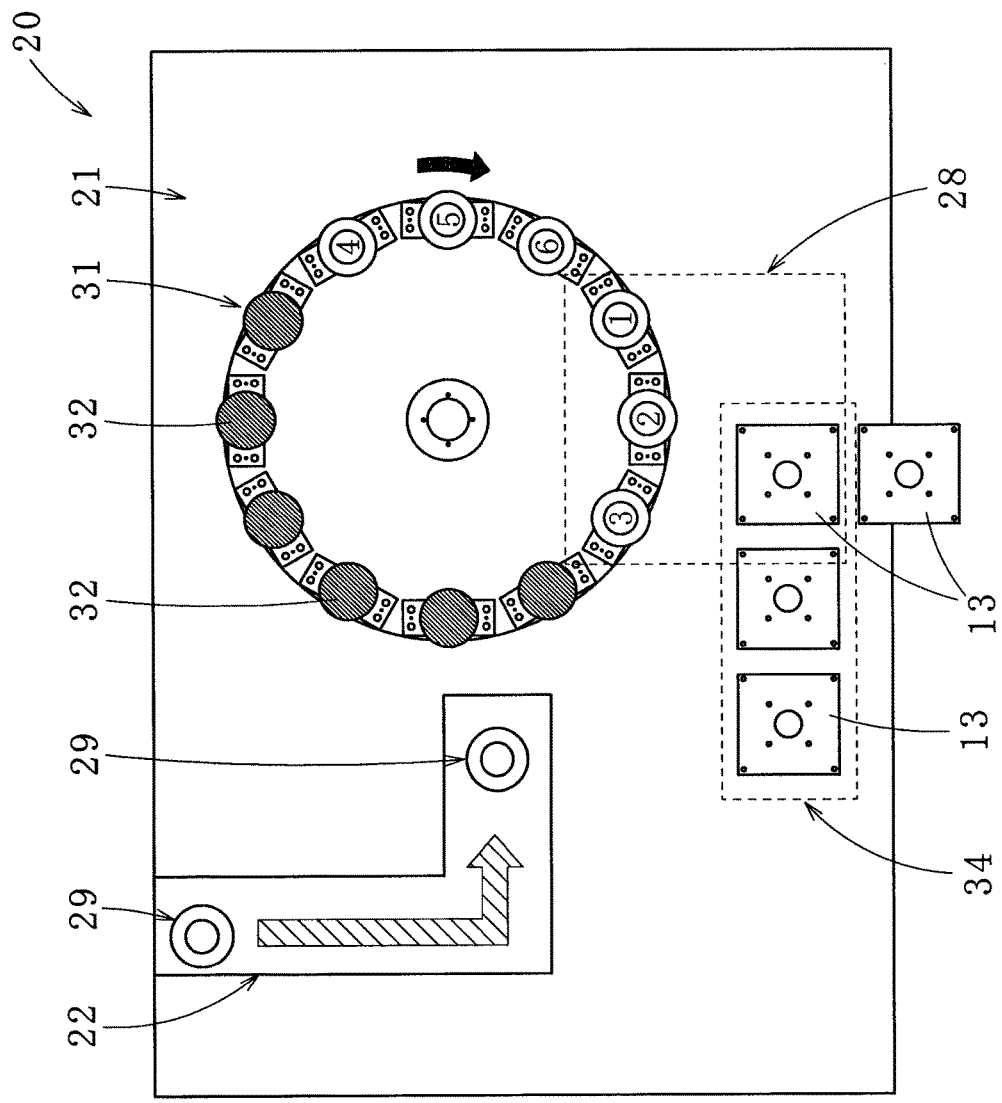
FIG. 6 is an explanatory diagram of a rotating and laminating step of the method for manufacturing the laminated iron core.

As shown in FIGS. 6 and 7, the downstream side of the lamination thickness inspecting unit 26 and the shape inspecting unit 27 is provided with the rotating and laminating unit 28.

This rotating and laminating unit 28 rotates and laminates each of the separated block iron cores No. 1 to No. 6 in order different from order of lamination just before separation, that is, after reverse by the reversing unit 23 (right side of FIG. 3). For example, the rotating and laminating unit 28 can be configured to include a robot arm having a gripping part for gripping each of the block iron cores and having a function of rotating each of the gripped block iron cores through a preset angle, but is not limited to this configuration.

This rotation and lamination can be performed by sequentially placing each of the block iron cores No. 1 to No. 6 on the jig 13 arranged in proximity to the placement table 31 by jig supply unit 34.

In addition, in the case of placing each of the block iron cores No. 1 to No. 6 on the jig 13, a position of display formed in each of the block iron cores No. 1 to No. 6 is recognized before placement by image processing using an imaging camera, and each of the block iron cores is rotated through a preset angle.

In this way, the laminated iron core 10 shown in FIG. 1A can be obtained.

In the block iron core No. 6 of this laminated iron core 10, a caulking protrusion 35 is projected, but this caulking protrusion 35 can be removed (crushed) in a subsequent step.

As described above, the laminated iron core 10 rotated and laminated by the manufacturing apparatus 20 is conveyed to the downstream side in a state placed on the jig 13, and each of the magnet-insert holes is filled with the resin described above and further using welding, the block iron cores No. 1 to No. 6 can be mutually joined.

In addition, the block iron core separating unit 24, the burr removing unit 25, the lamination thickness inspecting unit 26, the shape inspecting unit 27, and the rotating and laminating unit 28 described above are sequentially arranged around the placement table 31 from the upstream side toward the downstream side in a rotating direction of the placement table 31, but are not limited to this arrangement. For example, the block iron core separating unit 24, the burr removing unit 25, the lamination thickness inspecting unit 26, the shape inspecting unit 27, and the rotating and laminating unit 28 may be linearly arranged without using the placement table 31.

Subsequently, a method for manufacturing the laminated iron core according to one embodiment of the present invention will be described with reference to FIGS. 1A and 2 to 7.

The method for manufacturing the laminated iron core 10 is a method for rotating and laminating plural block iron cores No. 1 to No. 6 respectively formed by laminating plural iron core pieces blanked from a thin plate workpiece using a the in a place different from a location of the die. The method includes a reversing step, a block iron core separating step, a burr removing step, a lamination thickness inspecting step, a shape inspecting step, and a rotating and laminating step. Hereinafter, description will be made in detail.

(Reversing Step)

As shown in FIG. 2, the temporarily laminated block iron cores No. 1 to No. 6 ejected from the die, that is, the laminated iron core 29 in a temporarily laminated state with its laminated state maintained is horizontally conveyed by the conveying unit 22.

During this conveyance (before the block iron core separating step), the fronts and backs (that is, upper and lower portions of the laminated iron core 29 in the temporarily laminated state) of a unit of the temporarily laminated block iron cores No. 1 to No. 6 are reversed by the reversing unit 23 as shown in FIGS. 2 and 3.

(Block Iron Core Separating Step)

As shown in FIG. 2, by the block iron core separating unit 24, the temporarily laminated block iron cores No. 1 to No. 6 are individually separated and are sequentially arranged in each of the fixing parts 32 formed on the placement table 31.

In addition, in FIG. 2, after the block iron cores No. 1 to No. 3 in the block iron cores No. 1 to No. 6 constructing the laminated iron core 29 in the temporarily laminated state are first arranged in the fixing parts 32, the placement table 31 is rotated 90°, and the remaining block iron cores No. 4 to No. 6 are arranged in the fixing parts 32.

(Burr Removing Step)

As shown in FIG. 4, burrs projected at the back sides of the block iron cores No. 1 to No. 3 are removed by the burr removing unit 25.

In addition, at this time, the other block iron cores No. 4 to No. 6 are arranged in the fixing parts 32, with the result that plural pieces of work can be done in parallel.

(Lamination Thickness Inspecting Step)

As shown in FIG. 5, lamination thicknesses of the block iron cores No. 1 to No. 3 are inspected by the lamination thickness inspecting unit 26. Here, the block iron core satisfying a management value of the lamination thickness proceeds to the next step, and the block iron core which does not satisfy the management value of the lamination thickness is discarded.

Also, at this time, the other block iron cores No. 4 to No. 6 are burred, with the result that plural pieces of work can be done in parallel.

(Shape Inspecting Step)

As shown in FIG. 5, shapes of the block iron cores No. 1 to No. 3 are inspected by the shape inspecting unit 27. Here, the block iron core with a normal shape proceeds to the next step, and the block iron core with a defective shape is discarded.

In addition, the shape inspecting step may be performed at the time different from that of the lamination thickness inspecting step described above, but can simultaneously be performed to thereby improve work efficiency.

(Rotating and Laminating Step)

As shown in FIGS. 6 and 7, by the rotating and laminating unit 28, each of the separated block iron cores No. 1 to No. 6 with the burr removing step, the lamination thickness inspecting step and the shape inspecting step performed is rotated and laminated on the jig 13 in order different from order of lamination just before separation, that is, after reverse by the reversing unit 23 (right side of FIG. 3).

This rotation and lamination can be performed by sequentially placing each of the block iron cores No. 1 to No. 6 on the jig 13 arranged in proximity to the placement table 31 by the jig supply unit 34 after a position of display formed in each of the block iron cores No. 1 to No. 6 is recognized by image processing using an imaging camera.

In addition, when the position of display cannot e recognized, an angle of rotation and lamination is not found, with the result that the rotation and lamination are stopped and subsequently, the rotation and lamination are performed using the block iron core capable of recognizing the position of display.

In FIG. 7, each of the block iron cores No. 1 to No. 6 is rotated 180° and is laminated one by one, but an angle of rotation can be changed according to, for example, a kind of laminated iron core.

In this way, the laminated iron core 10 shown in FIG. 1A can be obtained.

In addition, the laminated iron core 11 shown in FIG. 1B can be obtained by reversing the front and back of each of the block iron cores No. 1 to No. 6 and changing (replacing) order of lamination of the block iron cores after the completion of the burr removing step, the lamination thickness inspecting step and the shape inspecting step described above.

As described above, the laminated iron core 10 rotated and laminated by the manufacturing apparatus 20 is conveyed to the downstream side in a state placed on the jig 13, and each of the magnet-insert holes is filled with the resin described above and further using welding, the block iron cores No. 1 to No. 6 are mutually joined.

The present invention has been described above with reference to the embodiment, but the present invention is not limited to the configuration described in the embodiment described above, and also includes other embodiments and modified examples contemplated within the scope of the matter described in the claims. For example, the case of constructing the method for manufacturing the laminated iron core and the apparatus for manufacturing the laminated iron core of the present invention by combining a part or all of the respective embodiments and modified examples described above is also included in the scope of right of the present invention.

For example, a structure of the laminated iron core is not limited to the embodiment described above, and a structure formed with an oil hole may be used. A shape inspection of this oil hole can be conducted by the shape inspecting unit described above.

Also, the embodiment described above describes the case of constructing the apparatus for manufacturing the laminated iron core of the reversing unit, the block iron core separating unit, the burr removing unit, the lamination thickness inspecting unit, the shape inspecting unit, and the rotating and laminating unit. However, the apparatus for manufacturing the laminated iron core is not limited to this case, and may be constructed of only the block iron core separating unit and the rotating and laminating unit as necessary, and can also be constructed by selectively adding any one or two or more of the reversing unit, the burr removing unit, the lamination thickness inspecting unit and the shape inspecting unit to the block, iron core separating unit and the rotating and laminating unit. In addition, in this case, each of the steps constructing the method for manufacturing the laminated iron is constructed similarly.

What is claimed is:

1. A method for manufacturing a laminated iron core, the method comprising:
   receiving a plurality of block iron cores which are temporarily laminated and ejected from a die, each block iron core being formed by laminating a plurality of iron core pieces that are blanked from a thin plate workpiece using the die;
   individually separating the temporarily laminated block iron cores by a block iron core separating unit; and
   rotating and laminating each of the separated block iron cores by a rotating and laminating unit in a place different from a location of the die.

2. The method for manufacturing the laminated iron core according to claim 1, wherein each of the individually separated block iron cores is sequentially arranged on a disk-shaped placement table rotatable around a shaft center at intervals in a circumferential direction of the placement table.

3. The method for manufacturing the laminated iron core according to claim 1, further comprising:
   inspecting a lamination thickness of each of the block iron cores by a lamination thickness inspecting unit between separating the temporarily laminated block iron cores and rotating and laminating the separated block iron cores.

4. The method for manufacturing the laminated iron core according to claim 1, further comprising:
   inspecting a shape of each of the block iron cores by a shape inspecting unit between separating the temporarily laminated block iron cores and rotating and laminating the separated block iron cores.

5. The method for manufacturing the laminated iron core according to claim 1, further comprising:

reversing fronts and backs of a unit of the plurality of temporarily laminated block iron cores by a reversing unit before separating the temporarily laminated block iron cores.

6. The method for manufacturing the laminated iron core according to claim 5, further comprising:
removing burrs projected at a back side of each of the block iron cores by a burr removing unit between separating the temporarily laminated block iron cores and rotating and laminating the separated block iron cores.

7. The method for manufacturing the laminated iron core according to claim 1, wherein each of the separated block iron cores is rotated and laminated in an order different from an order of lamination of the unseparated temporarily laminated block iron cores.

8. An apparatus for manufacturing a laminated iron core, the apparatus comprising:
a block iron core separating unit that is provided in an upstream side and receives a plurality of block iron cores which are temporarily laminated and ejected from a die, each block iron core being formed by laminating a plurality of iron core pieces that are blanked from a thin plate workpiece using the die, wherein the block iron core separating unit individually separates the temporarily laminated block iron cores; and
a rotating and laminating unit that is provided in a downstream side of the block iron core separating unit and rotates and laminates each of the separated block iron cores in a place different from a location of the die.

9. The apparatus for manufacturing the laminated iron core according to claim 8, further comprising:
a disk-shaped placement table rotatable around a shaft center, wherein each of the block iron cores individually separated by the block iron core separating unit can be arranged on the placement table at intervals in a circumferential direction.

10. The apparatus for manufacturing the laminated iron core according to claim 8, further comprising:
a lamination thickness inspecting unit that inspects a lamination thickness of each of the block iron cores individually separated by the block iron core separating unit in a downstream side of the block iron core separating unit and an upstream side of the rotating and laminating unit.

11. The apparatus for manufacturing the laminated iron core according to claim 8, further comprising:
a shape inspecting unit that inspects a shape of each of the block iron cores individually separated by the block iron core separating unit in a downstream side of the block iron core separating unit and an upstream side of the rotating and laminating unit.

12. The apparatus for manufacturing the laminated iron core according to claim 8, further comprising:
a reversing unit that reverses fronts and backs of a unit of the plurality of temporarily laminated block iron cores in an upstream side of the block iron core separating unit.

13. The apparatus for manufacturing the laminated iron core according to claim 12, further comprising:
a burr removing unit that removes burrs projected at a back side of each of the block iron cores individually separated by the block iron core separating unit in a downstream side of the block iron core separating unit and an upstream side of the rotating and laminating unit.

14. The apparatus for manufacturing the laminated iron core according to claim 8, wherein the rotating and laminating unit rotates and laminates each of the separated block iron cores in an order different from an order of lamination of the unseparated temporarily laminated block iron cores.

* * * * *